United States Patent
Shigemura et al.

(10) Patent No.: US 7,589,898 B2
(45) Date of Patent: Sep. 15, 2009

(54) OPTICAL ELEMENT ARRAY, DISPLAY DEVICE, AND METHOD OF MANUFACTURING DISPLAY DEVICE, OPTICAL ELEMENT ARRAY AND OPTICAL ELEMENT ARRAY MOLDING DIE

(75) Inventors: Kouji Shigemura, Tokyo (JP); Nobuaki Takanashi, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 11/898,268

(22) Filed: Sep. 11, 2007

(65) Prior Publication Data

US 2008/0068720 A1    Mar. 20, 2008

(30) Foreign Application Priority Data

Sep. 15, 2006  (JP) ............................. 2006-250922

(51) Int. Cl.
G02B 27/10    (2006.01)
G03B 21/60    (2006.01)

(52) U.S. Cl. ....................................... 359/619; 359/454

(58) Field of Classification Search ......... 359/454–457, 359/619–624, 626
See application file for complete search history.

(56) References Cited

U.S. PATENT DOCUMENTS 5,967,032 A * 10/1999 Bravenec et al. ............ 101/211
6,515,800 B1 * 2/2003 Border et al. ............... 359/619
7,236,665 B2 * 6/2007 Kobayashi et al. ............ 385/33
2007/0008617 A1 * 1/2007 Shestak et al. .............. 359/455

FOREIGN PATENT DOCUMENTS

JP   06-324317   11/1994
JP   10-123633   5/1998

* cited by examiner

Primary Examiner—Scott J Sugarman
Assistant Examiner—Dawayne A Pinkney
(74) Attorney, Agent, or Firm—Foley & Lardner LLP

(57) ABSTRACT

The present invention provides an optical element array that enables lens mounting at low cost and high precision, a display device enabling stereoscopic display using the optical element array, and a method of manufacturing the display device. A lens sheet of the present invention is configured by a plurality of unit lenses and a non-periodic flat part, the non-periodic flat part functioning as a lens reference mark for positioning. A display device is configured using the lens sheet such that the non-periodic flat part of the lens sheet overlaps a positioning mark of a display panel. Since the non-periodic flat part serving as the lens reference mark is arranged on the positioning mark, observation shift of the positioning mark due to lens effect in time of alignment does not occur, and high precision alignment is realized.

18 Claims, 22 Drawing Sheets

1

OPTICAL ELEMENT ARRAY, DISPLAY DEVICE, AND METHOD OF MANUFACTURING DISPLAY DEVICE, OPTICAL ELEMENT ARRAY AND OPTICAL ELEMENT ARRAY MOLDING DIE

This application is based upon and claims the benefit of priority from Japanese patent application No. 2006-250922, filed on Sep. 15, 2006, the disclosure of which is incorporated herein in its entirety by reference.

BACKGROUND OF THE INVENTION

The present invention relates to an optical element array, including a lens sheet that uses a lenticular lens or a fly-eye lens to provide image display to a plurality of view points, for providing a unique display such as a stereoscopic display and view angle control; a display device; and a method of manufacturing a display device, an optical element array and an optical element array molding die.

With the need for a more sophisticated display device in recent years, a unique display device that combines an optical element array such as lenticular lens, prism sheet, or diffusion sheet to a display panel which uses electrical optical element such as liquid crystal, and that enables a stereoscopic image display and view angle control is used.

A display device using a lenticular lens sheet will be described by way of example of such display device. FIG. 16 is a frame format perspective view of the lenticular lens sheet, and FIG. 17 is a frame format view showing a configuration example of the display device using the lenticular lens sheet and a stereoscopic display method.

As shown in FIG. 16, a lenticular lens sheet 110 has one surface that is planar, and the other surface that is arranged with a plurality of cylindrical lenses 111 continuously in the parallel direction, each cylindrical lens having a hog-backed cross section at a circular cylindrical surface.

As shown in FIG. 17, a left eye pixel 115*a* and a right eye pixel 115*b* are alternately arranged so as to correspond to the focus of each cylindrical lens 111 on a display panel 114. When the left eye pixel 115*a* and the right eye pixel 115*b* are driven according to a predetermined signal by a drive circuit (not shown), a left eye image is formed in a left eye region 120*a* and a right eye image is formed in a right eye region 120*b* by the cylindrical lens 111, and a stereoscopic image is recognized by the observer. A normal two-dimensional image display can also be obtained by driving the right eye pixel 115*a* and the left eye pixel 115*b* with the same signal.

A multi-image simultaneous display device for displaying multiple images simultaneously has been proposed as a display device using the lenticular lens sheet. This device also enables simultaneous display of different images to a plurality of observers by allocating the image in observing directions by the cylindrical lens with a method similar to that for the stereoscopic display as described above.

In such display device using the lenticular lens sheet, the lenticular lens sheet is required to be mounted on the display panel at high precision to obtain a high quality stereoscopic image display or a multi-image simultaneous display. A technique proposed in Japanese Laid-Open Patent Publication No. 6-324317 (P. 3, [0013] to [0018], FIG. 1) (patent document 1) for such problem is shown in FIG. 18.

FIGS. 18A, 18B, 18C and 18D are frame format views describing a basic configuration of the invention of patent document 1, where 18A is a frame format view of a display panel, 18B is a frame format view of a lenticular lens plate and an alignment lenticular lens, 18C is a frame format view of a state in which the lenticular lens plate is slanted and overlapped with respect to the display panel, and 18D is a frame format view of when the lenticular lens plate is accurately overlapped.

A configuration in which a linear alignment mark 213 is arranged on one side of a display region 212 of the display panel 211, and an alignment lenticular lens 215 is arranged at a position corresponding to the alignment mark 213 of the lenticular lens plate 214 is proposed. According to such configuration, when the lenticular lens plate 214 is rotation shifted with respect to the display panel 211, only one part of the linear alignment mark 213 is enlarged as shown in FIG. 18C, and thus alignment can be easily carried out by moving the lenticular lens plate 214 such that the entire linear alignment mark 213 is enlarged as shown in FIG. 18D.

Similar technique is also proposed in Japanese Laid-Open Patent Publication No. 10-123633 (P. 3, [0016] to [0023], FIG. 1) (patent document 2). FIGS. 19A and 19B are frame format views describing a basic configuration of the invention of patent document 2, where 19A is a frame format view of a lenticular lens plate and 19B is a frame format view of an image sheet; and FIGS. 20A and 20B are frame format views in which parts of FIGS. 19A and 19B are enlarged, where 20A is a partial cross sectional view of the lenticular lens plate and the image sheet and 20B is a partial top view of the image sheet.

In this configuration as well, a reference line 317 is formed on the image sheet 315, and a positioning groove 314 is formed in the lenticular lens plate 312 at a position corresponding to the reference line 317, where adjustment is made such that the reference line 317 can be clearly observed as one straight line through the groove 314.

However, the background art described above has the following problems. The techniques disclosed in patent document 1 and patent document 2 of arranging a linear reference mark in the display panel and forming the lenticular lens or the groove at a position corresponding to the reference mark of the lenticular lens sheet to be mounted on the display panel is advantageous when performing alignment at visual level. However, with higher definition of the recent display panel, there are limitations to mounting precision in the technique of observing the reference mark through the lenticular lens or through the groove when higher precision mounting of the lenticular lens is being demanded.

One example of such case is shown in FIGS. 21A and 21B. FIGS. 21A and 21B are frame format views describing production of error when observing the reference mark through the lenticular lens, where 21A is a frame format view of the reference mark arranged on the display panel and 21B is a frame format view when observing the reference mark through the lenticular lens.

When observing the reference mark 130 arranged on the display panel (not shown) without interposing the lens, the reference mark appears as a straight line as shown in FIG. 21A. The state of FIG. 21B is obtained when observed with the lenticular lens 110 interposed on the reference mark 130 but without the lenticular lens 110 interposed on one part of the reference mark 130. A difference of $\Delta L$ is created when observed through the lens. The dimension of $\Delta L$ changes with lens specification such as lens shape and refraction index of lens material, and also changes with respect to the reference mark imaging position shift (change with respect to normal line direction from the reference mark). Therefore, high precision alignment through the lens is very difficult.

Problems still arise even if a groove pattern is used as shown in FIGS. 20A and 20B. FIGS. 22A and 22B are frame format views of when observing the reference pattern through the groove when the groove pattern is used for the lens, where 22A shows interference of the bottom part of the groove and the reference line and 22B shows lowering in visibility of the reference line caused by the groove shape and the refraction index of the groove material.

First, the groove bottom part 131 interferes with the reference line 317 thereby inhibiting the high precision alignment, as shown in FIG. 22A. Secondly, the visibility of the reference line 317 lowers due to the groove shape and the refraction index of the groove material when performing alignment using transmissive light 132, as shown in FIG. 22B.

The alignment precision further lowers since the pitch precision, the shape precision (curvature precision for lenses), or the like of the positioning lenticular lens or groove pattern varies.

In recent display panels, a display panel incorporating a drive circuit such as a gate driver circuit using a system-on-glass technique on the outer side of the display part region is proposed. When applying the method of known technique of arranging a linear reference mark in the display panel with respect to such display panel, a response such as arranging the reference mark on the outer side of the drive circuit and the like is required, and thus the frame becomes extremely large.

SUMMARY OF THE INVENTION

It is an exemplary object of the present invention to provide optical element arrays for achieving a unique display function, specifically, an optical element array for achieving an excellent stereoscopic image display, a display device, and a method of manufacturing the display device.

An exemplary aspect of an optical element array of the present invention is an optical element array formed by a plurality of optical elements; wherein at least one non-periodic flat part acting as a reference of alignment when combining with a display panel is arranged.

The non-periodic flat part may have an outer shape different from an outer shape of each optical element, the non-periodic flat part may be arranged linearly across an entire length of the optical element array, or the non-periodic flat part may have a thickness of less than or equal to the thickness of each optical element.

The optical element may be a cylindrical lens which is a convex lens with a circular cylindrical surface; the optical element array may be a lenticular lens sheet in which the cylindrical lens is arranged in plurals in parallel at a same lens pitch; and the non-periodic flat part may be a non-periodic flat part arranged linearly parallel to a length direction of the cylindrical lens near the ends of the lenticular lens sheet.

The optical element may be a fly-eye lens which is a convex lens with a spherical surface; the optical element array may be a fly-eye lens sheet with a lens surface in which the fly-eye lens is arranged in plurals at independent lens pitch in a first direction and in a second direction orthogonal to the first direction; the non-periodic flat part may include a first non-periodic flat part arranged linearly parallel to the first direction, and a second non-periodic flat part arranged linearly parallel to the second direction in the vicinity of the ends of the fly-eye lens sheet; the width of the non-periodic flat part may be different from the width of each lens; and the thickness of the non-periodic flat part may be less than or equal to the thickness of each lens. A cut-out portion may be formed at corners of the optical element array near the non-periodic flat part.

An exemplary aspect of a display device of the present invention includes the optical element array and a display panel including a pixel part made up of a plurality of optical elements and a positioning mark for alignment.

The positioning mark of the display panel may be arranged at a position overlapping the non-periodic flat part of the optical element array, or the positioning mark of the display panel may be arranged at a position overlapping the cut-out portion of the optical element array.

The optical element array and the display panel may be fixed with an adhesive measure, where the adhesive measures may be a light curing resin or a double-faced adhesive film, and furthermore, a polarization plate may be arranged between the optical element array and the display panel, where the polarization plate has an outer shape larger than an outer shape of the optical element array.

An exemplary aspect of a manufacturing method of the present invention may include steps of simultaneously imaging and positioning the positioning mark of the display panel and the non-periodic flat part of the optical element array, or simultaneously imaging the positioning mark of the display panel, the non-periodic flat part of the optical element array, and the cut-out portion formed in the optical element array; and aligning may be performed by using the difference in a width of the non-periodic flat part formed in the optical element array and a width of each optical element.

An exemplary aspect of a manufacturing method of the optical element array of the present invention is a method of manufacturing an optical element array in which a plurality of optical elements are arranged at a predetermined period; the method including the steps of forming a plurality of patterns corresponding to the optical element shape at a predetermined period at one part of a die; forming a flat part adjacent to the pattern at another one part of the die; forming a pattern corresponding to the optical element shape adjacent to the flat part at another one part of the die; and molding the optical element array using the die. The optical element may be a cylindrical lens or a fly-eye lens.

An exemplary aspect of a manufacturing method of an optical element array molding die; the method including the step of:

cutting a surface of the optical element array molding die at a predetermined period using a cutting tool corresponding to an optical element shape, and at the same time, performing a non-periodic cutting, the period being greater than the predetermined period, to form a non-periodic flat part in the optical element array molding die.

The present invention provides an optical element array with an alignment reference by arranging an inexpensive and high precision non-periodic flat part in the optical element array.

In the present invention, a stereoscopic display device of high image quality can be obtained since high precision lens mounting with little error is realized by overlapping the reference mark of the display panel and the non-periodic flat part of the optical element array.

Furthermore, in this invention, low temperature process is possible since the present invention uses light curing resin or double-faced transparent adhesive film to fix the optical element array and the display panel. This contributes to high precision lens mounting and also enables application to plastic substrate of low heat resistance, and thus a light and thin display device having flexibility can be obtained.

Moreover, the present invention is widely applicable to not only the lens sheet but to other optical element arrays. In this case as well, at least one non-periodic flat part is arranged on the optical element array. The high precision optical element array mounting is achieved by matching the non-periodic flat part and the position of the display panel.

As an exemplary advantage according to the invention, in the optical element array including the lens sheet, the display device, and the method of manufacturing the display device of the present invention, the optical element array provided with reference mark function of the lens can be provided at low cost by arranging the inexpensive and high precision non-periodic flat part in the optical element array.

As another exemplary advantage according to the invention, the present invention realizes high precision lens mounting by overlapping the reference mark of the display panel and the non-periodic flat part of the optical element array, and thus a stereoscopic display device of high image quality can be obtained.

As still another exemplary advantage according to the invention, low temperature process is possible since the present invention uses light curing resin or double-faced transparent adhesive film for fixing the optical element array and the display panel, which contributes to high precision lens mounting, and also this invention is applicable to plastic substrate of low heat resistance, whereby a light and thin display device having flexibility can be obtained.

As a further exemplary advantage according to the invention, the present invention is widely applicable to not only the lens sheet but to other optical element arrays. In this case as well, at least one non-periodic flat part is arranged on the optical element array, and the non-periodic flat part and the position of the display panel are matched to achieve high precision optical element array mounting.

As a still further exemplary advantage according to the invention, the present invention relates to a manufacturing method of molding using a die in which a pattern corresponding to a plurality of optical elements are formed in a predetermined period; the method including the step of cutting at a predetermined period using a cutting tool corresponding to an optical element shape, and at the same time, performing a non-periodic cutting, the period being greater than the predetermined period, to arrange a non-periodic flat part in the die, and molding the optical element array using the die, whereby manufacturing of the die is facilitated and the optical element array is manufactured with a die of accurate shape.

BRIEF DESCRIPTION OF THE DRAWINGS

The invention, together with objects and advantages thereof, may best be understood by reference to the following description of the exemplary embodiment together with the accompanying drawings in which.

DETAILED DESCRIPTION OF THE PREFERRED EMBODIMENTS

The exemplary embodiments of the present invention will now be described with reference to the drawings.

First Exemplary Embodiment

Figure 1:
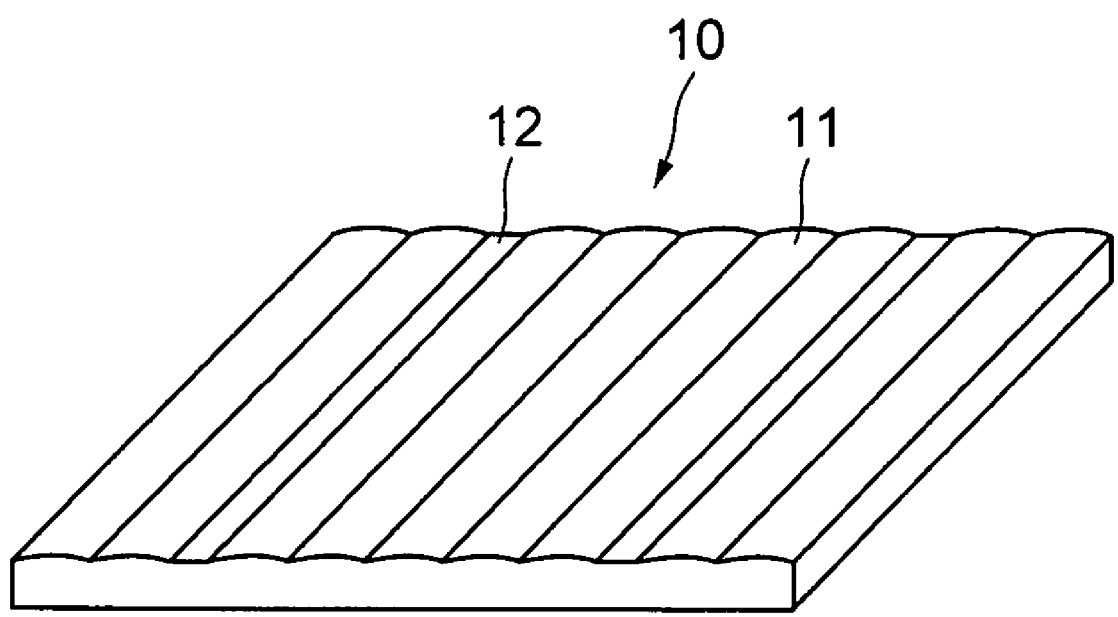
FIG. 1 is a frame format perspective view of a lenticular lens sheet according to a first exemplary embodiment of the present invention.
Figure 2A:
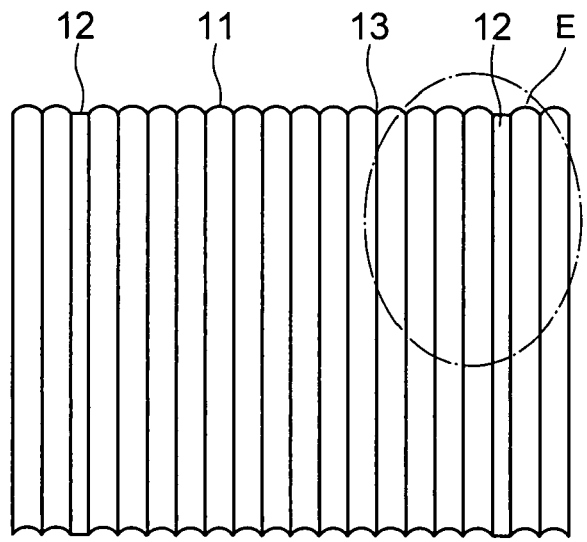
FIGS. 2A and 2B are frame format top views of the lenticular lens sheet of FIG. 1, where 2A is an overall view and 2B is a partially enlarged view of E region at the end of the lens sheet including a non-periodic flat part in 2A.
Figure 2B:
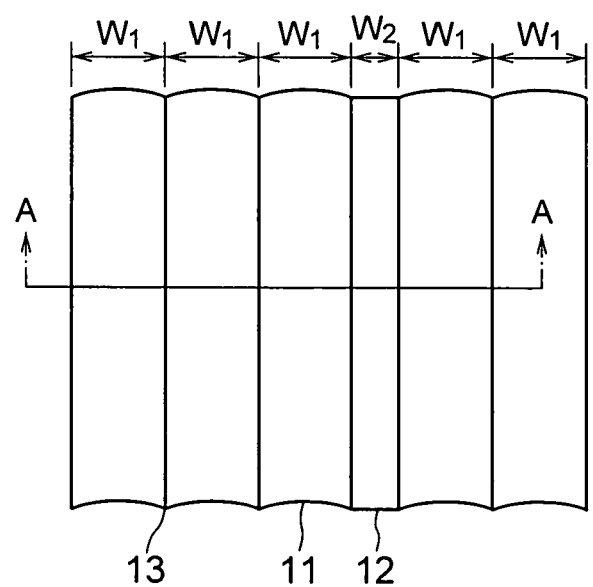
Figure 3:
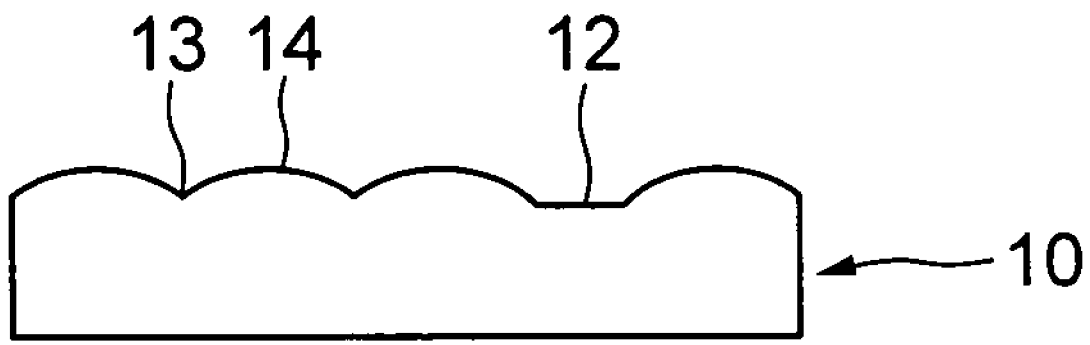
FIG. 3 is a cross sectional view taken along line A-A of FIG. 2B.

FIG. 1 is a frame format perspective view of a lenticular lens sheet according to a first exemplary embodiment of the present invention; FIGS. 2A and 2B are frame format top views of the lenticular lens sheet of FIG. 1, where 2A is an overall view and 2B is a partially enlarged view of E region at the end of the lens sheet including a non-periodic flat part in 2A; and FIG. 3 is a cross sectional view taken along line A-A of FIG. 2B.

In the following exemplary embodiments, a lenticular lens sheet and a fly-eye lens sheet will be described by way of example, but is not limited thereto, and optical element arrays including prism sheet, reflective sheet, and diffusion sheet, which are formed with a predetermined pattern, may be widely adopted.

A lenticular lens sheet 10 according to the first exemplary embodiment of the present invention includes a plurality of cylindrical lenses 11, which are convex lenses with a circular cylindrical surface, and a linear non-periodic flat part 12 serving as a non-periodic flat part in the vicinity of the sheet ends. The lenticular lens sheet 10 is used in a display device to provide an image display to a plurality of view points, the lenticular lens sheet being attached to the display surface of a display panel and transmitting the wavelength of at least some of the visible light region.

The lenticular lens sheet 10 according to the present exemplary embodiment merely needs to transmit at least some light having a wavelength between 400 and 800 nm, and the material thereof may be inorganic material or organic material. The inorganic materials include glass etc., and organic materials include plastic etc., where plastic is normally often used. Plastic includes engineering plastic such as polymethylmethacrylate (PMMA), cyclopolyolefin (COP), polycarbonate (PC), and the like. The thickness of the lenticular lens sheet 10 is not particularly limited, but is desirably between 0.1 and 0.5 mm from practical standpoint.

The lenticular lens sheet 10 is configured by the plurality of cylindrical lenses 11 and the non-periodic flat parts 12, as described above. The non-periodic flat part 12 is a portion having a shape that does not produce lens effect, the surface being a plane herein, and is arranged at a position two cylindrical lenses 11 from the end of the lenticular lens sheet 10. The non-periodic flat part 12 may be arranged at the ends, but can be easily positioned if sandwiched by the cylindrical lenses 11 having a different width from the non-periodic flat part 12 at the time of positioning. From the standpoint of ensuring observation resolution in time of positioning, the thickness of the sheet of the non-periodic flat part 12 is desirably less than or equal to the thickness of a lens apex part 14. The thickness of the non-periodic flat part also does not need to be uniform, and a gradient may be provided to the thickness according to circumstances.

The non-periodic flat part 12 shown in FIGS. 1 and 2 is arranged on both sides of the lenticular lens sheet 10, but may be arranged on only one side. The width $W_2$ of the non-periodic flat part 12 is formed so as to be different from the width $W_1$ of the cylindrical lens 11.

Figure 4:
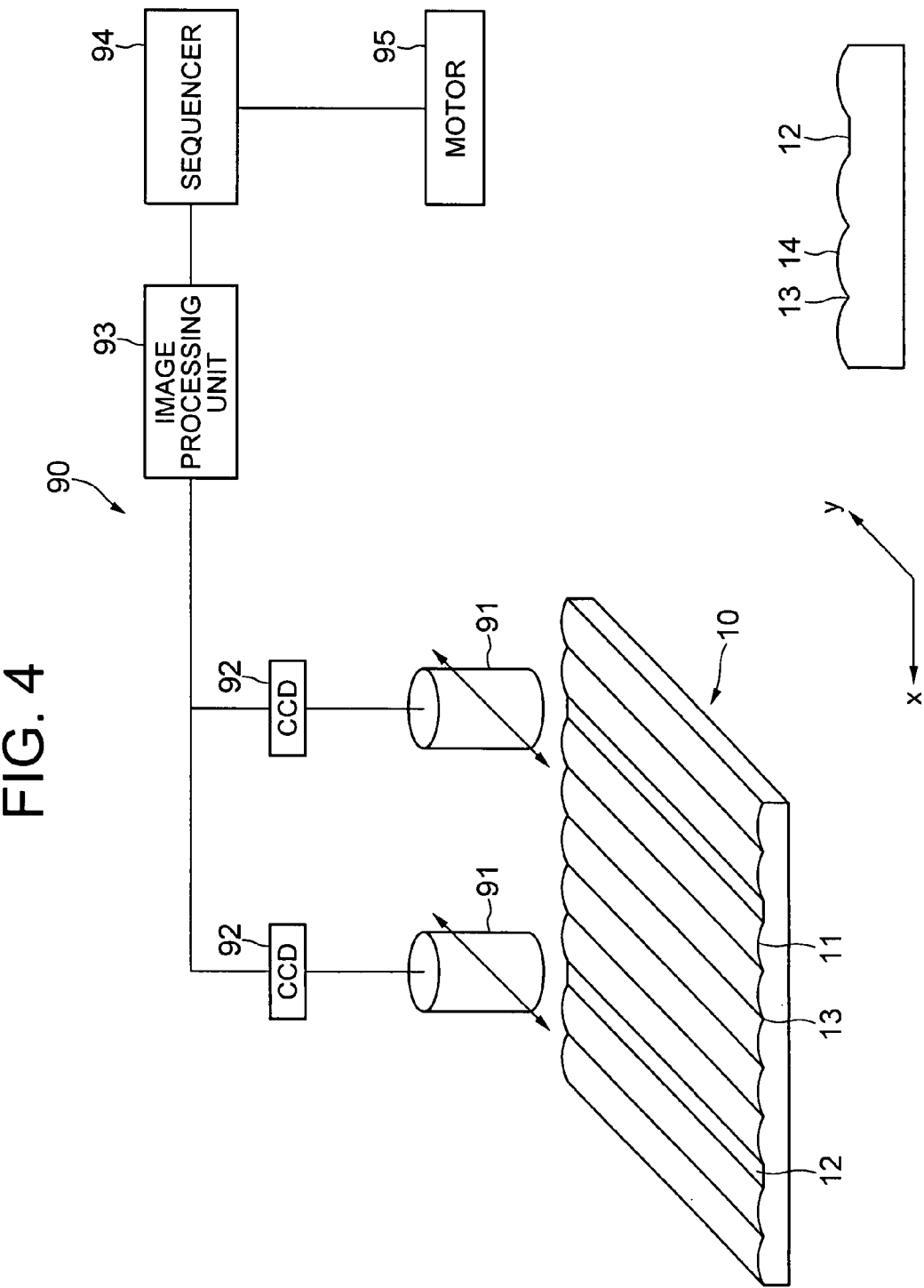
FIG. 4 is a frame format block configuration view of a reference position detecting device of the lenticular lens sheet.

FIG. 4 is a frame format block configuration view of a reference position detecting device of the lenticular lens sheet. A reference position detecting device 90 is an example of a device for detecting the reference position of the cylindrical lens 11 using the non-periodic flat part 12 of the lenticular lens sheet 10. First, a region including the non-periodic flat part 12 of the lenticular lens sheet 10 fixed on an appropriate stage (not shown) is imaged while being scanned in a y-axis direction in FIG. 4 with an optical system 91 configured by lens, lighting, and the like, and the image information obtained by a CCD 92 is sequentially sent to an image processing unit 93. Pattern matching is performed using the fact that the width $W_2$ (FIG. 2) of the non-periodic flat part 12 differs from the width $W_1$ of the cylindrical lens 11. The shifted amount $\Delta x$ in an x-axis direction of the non-periodic flat part 12 with respect to the movement amount $\Delta y$ of the camera is thereby obtained by the image processing unit 93. The rotational shift $\Delta\theta$ with the camera scanning axis as the reference can be calculated from $\Delta y$ and $\Delta x$, whereby the relative position of the cylindrical lens 11 with respect to the optical system 91 can be detected. When the stage is driven by a motor 95, $\Delta y$, $\Delta x$, and $\Delta\theta$ are sent to a sequencer 94, and the motor 95 is driven by the sequencer 94 thereby enabling a control of lining the lenticular lens sheet 10 in the same direction as the camera scanning axis.

Figure 5A:
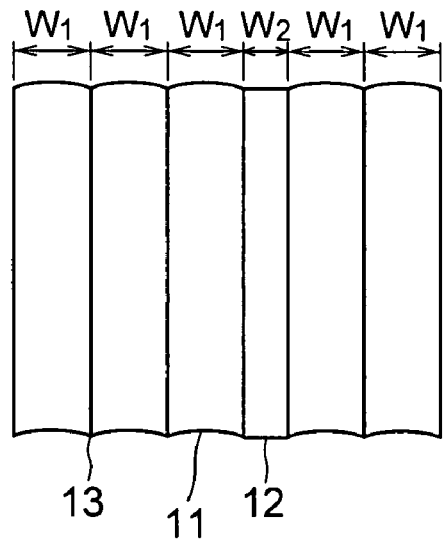
FIGS. 5A, 5B and 5C are partial top views of the lenticular lens sheet for describing plural methods of pattern matching, where 5A shows a case of using the width of the non-periodic flat part, 5B shows a case of using the spacing of the groove parts of the cylindrical lens, and 5C shows a case of using the spacing of the apex parts of the cylindrical lens.
Figure 5B:
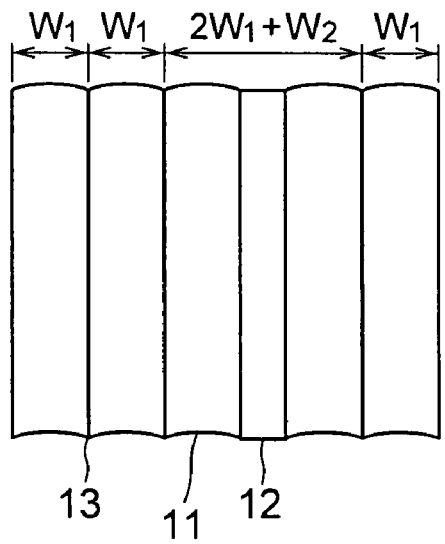
Figure 5C:
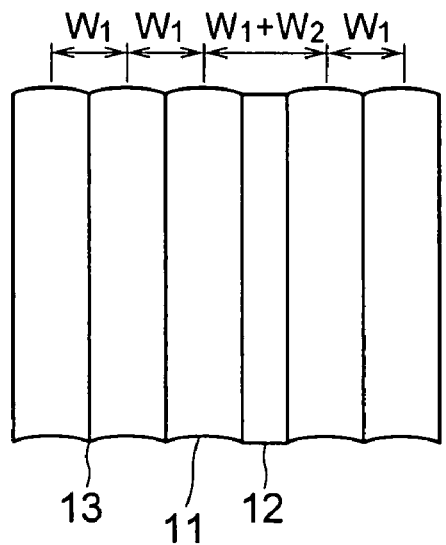

FIGS. 5A, 5B and 5C are partial top views of the lenticular lens sheet for describing plural methods of pattern matching, where 5A shows a case of using the width of the non-periodic flat part, 5B shows a case of using the spacing of the groove parts of the cylindrical lens, and 5C shows a case of using the spacing of the apex parts of the cylindrical lens. The pattern matching may use the spacing $(2W_1+W_2)$ of the groove parts 13 of the lenticular lens as shown in FIG. 5B, or the spacing $(W_1+W_2)$ of the apex parts 14 as shown in FIG. 5C. In either pattern matching, the fact that groove pitch or apex pitch differs only in the region where the non-periodic flat part 12 is arranged is used.

The pattern matching can also be performed using the information imaged from the back surface of the lenticular lens sheet 10. In this case as well, the flat part of the non-periodic flat part 12 or the change in pitch of the lenticular lens groove parts 13 or the apex parts 14 can be used.

In the present exemplary embodiment, a configuration of arranging the linear non-periodic flat part 12 near the ends of the lenticular lens sheet 10 has been described. However, the present exemplary embodiment of the present invention is not limited thereto, and may be applied to a fly-eye lens sheet in which the convex lenses are arranged in matrix form, or a prism sheet, a reflective sheet, and a diffusion sheet, in which a predetermined pattern is formed.

Figure 6:
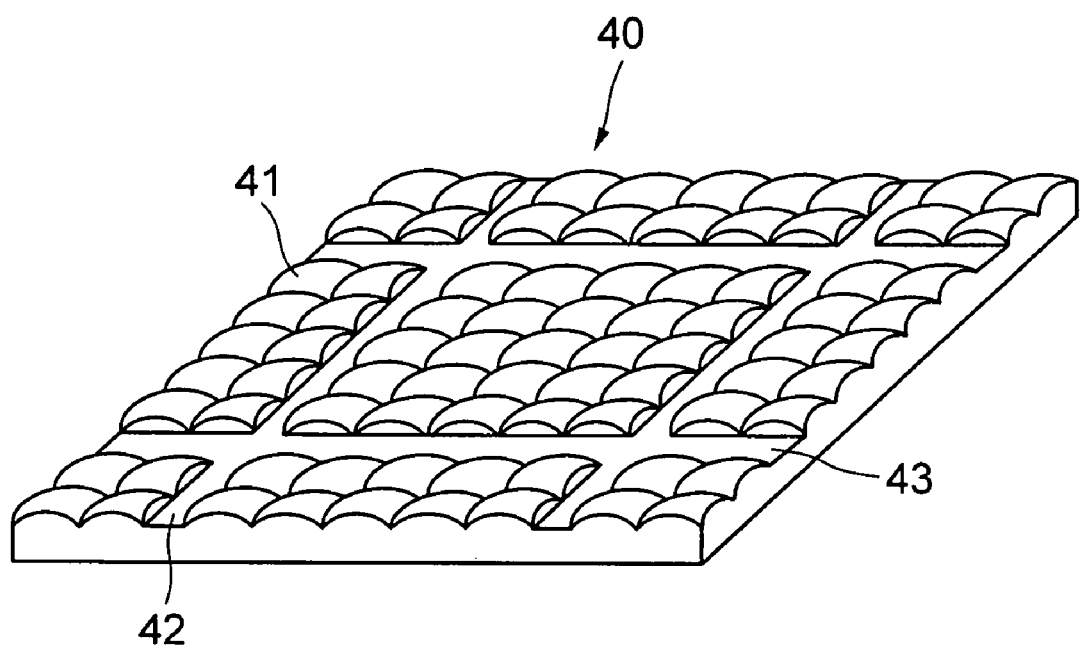
FIG. 6 is a frame format perspective view of a fly-eye lens sheet of the present invention.

FIG. 6 is a frame format perspective view of a fly-eye lens sheet according to the exemplary embodiment of the present invention. A fly-eye lens sheet 40 according to the present invention includes a plurality of fly-eye lenses 41, a first linear non-periodic flat part 42 arranged near the sheet ends, and a second linear non-periodic flat part 43 orthogonal to the first non-periodic flat part 42, similar to the lenticular lens sheet 10 described above.

Similarly, the lenticular lens sheet can include a second non-periodic flat part perpendicular to a longitudinal direction of the lens, such as the non-periodic flat part shown in the fly-eye lens sheet of FIG. 6 in addition to the non-periodic flat part parallel to the longitudinal direction of the lens, such as the non-periodic flat part shown in FIG. 5.

Figure 7A:
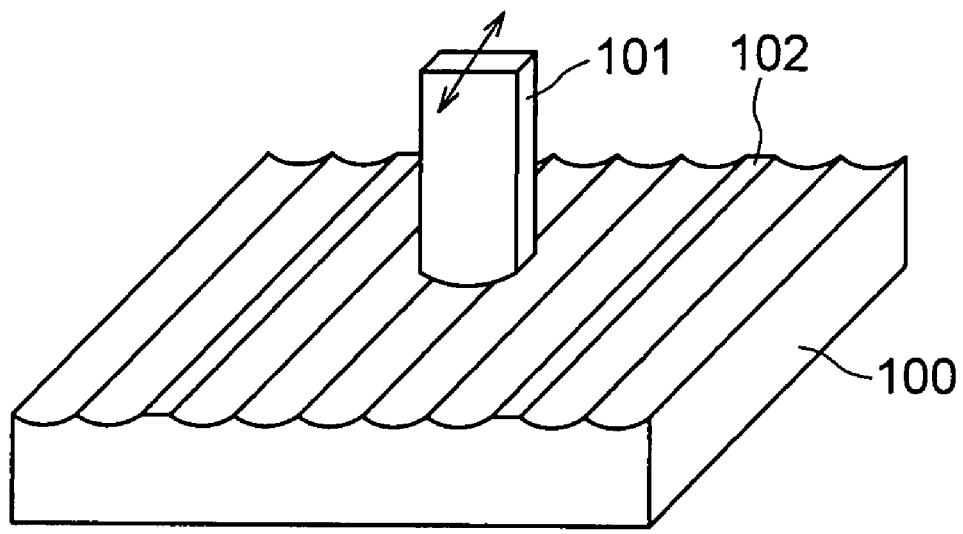
FIGS. 7A and 7B are frame format perspective views showing one example of a die and a cutting tool necessary in forming the lenticular lens sheet, where 7A shows the die and the cutting tool, and 7B shows a molding step of the lenticular lens sheet.
Figure 7B:
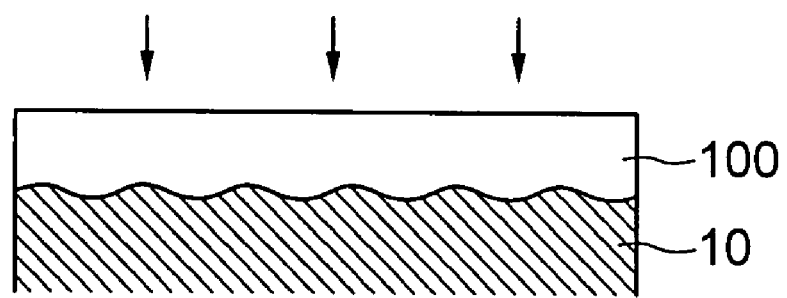

A die necessary in forming the lenticular lens sheet 10 will now be described. FIGS. 7A and 7B are frame format perspective views showing one example of a die and a cutting tool necessary in forming the lenticular lens sheet, where 7A shows the die and the cutting tool, and 7B shows a molding step of the lenticular lens sheet. As shown in FIG. 7B, the lenticular lens sheet 10 is formed through heat press and injection molding using a die 100. The die precision is a factor that greatly determines the lens shape precision such as curvature radius, lens pitch, and surface roughness of the lenticular lens sheet, and surface treatment by the cutting tool 101 is usually performed to obtain the die of high precision.

A tool having a dimension corresponding to the curvature radius of the lens is arranged at the distal end of the cutting tool 101, and the cutting process is performed in the direction of the arrow at a feeding pitch corresponding to the lens pitch. The die pattern 102 corresponding to the non-periodic flat part 12 described above is easily formed by setting the feeding pitch of the cutting tool 101 larger than the lens pitch.

As described above, in the lenticular lens sheet according to the present exemplary embodiment, the non-periodic flat part of low cost and high precision is arranged in the lens sheet to act as a lens reference mark.

Second Exemplary Embodiment

In the present exemplary embodiment, an example of a display device using the lenticular lens sheet and the fly-eye lens sheet as the optical element array described in the first exemplary embodiment will be described.

Figure 8:
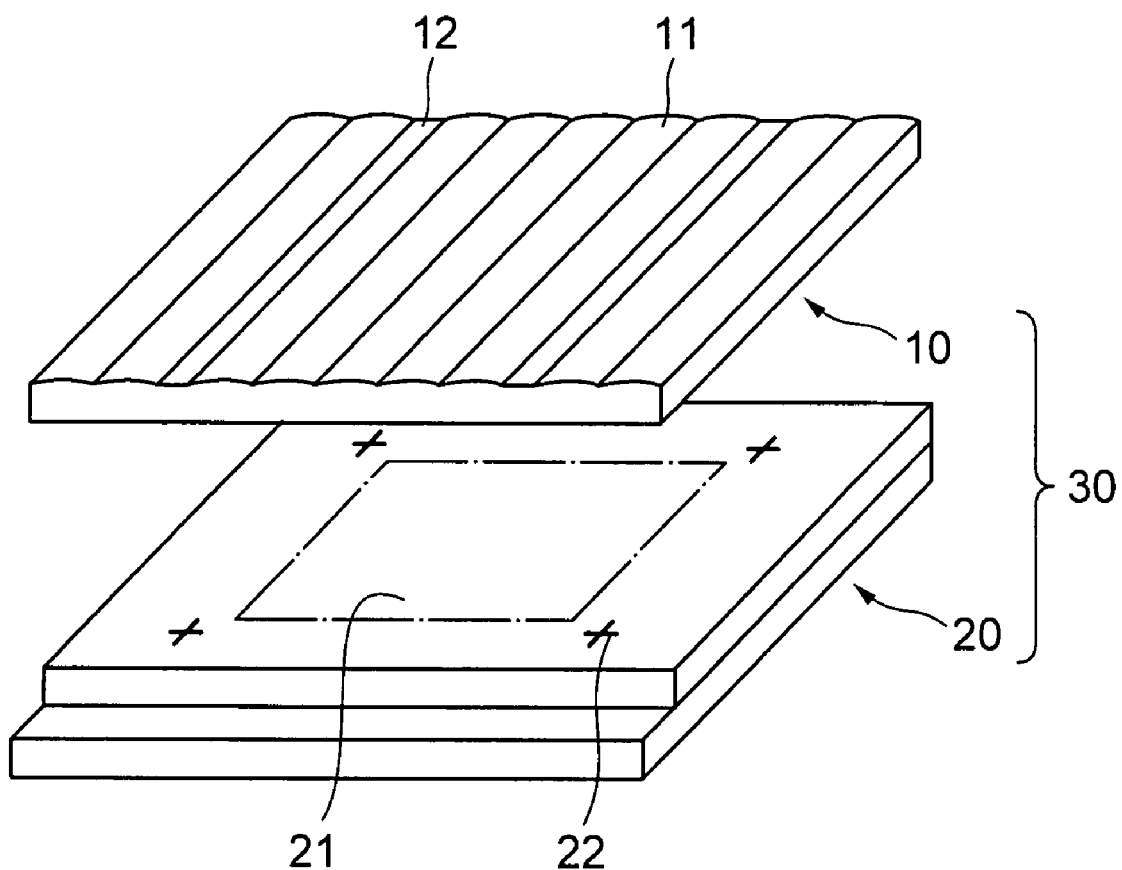
FIG. 8 is a frame format exploded perspective view of one example of a display device of a second exemplary embodiment.

FIG. 8 is a frame format exploded perspective view of one example of the display device of the second exemplary embodiment. That is, a display device 30 of the second exemplary embodiment includes at least a display panel 20 with a display part 21 and a positioning mark 22, and the lenticular lens sheet 10.

Figure 9A:
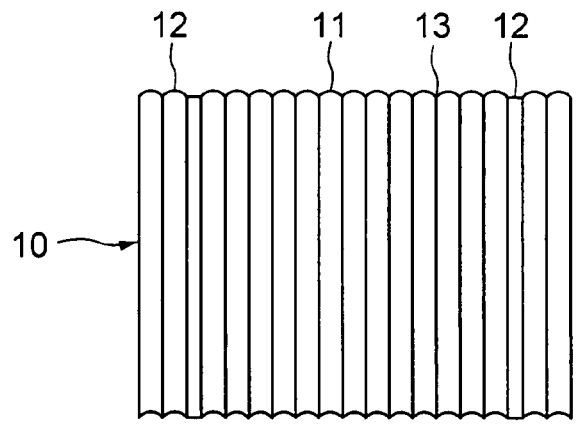
FIGS. 9A, 9B and 9C are top views showing one example of the display device of FIG. 8, where 9A shows the lenticular lens sheet, 9B shows the display panel, and 9C shows the display device combining the lenticular lens sheet and the display panel.
Figure 9B:
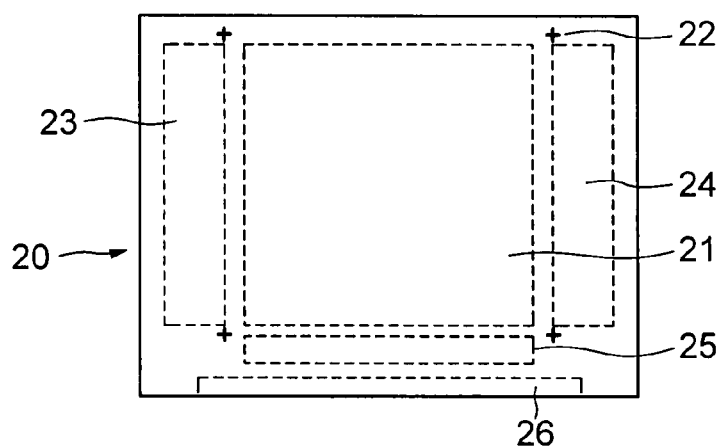
Figure 9C:
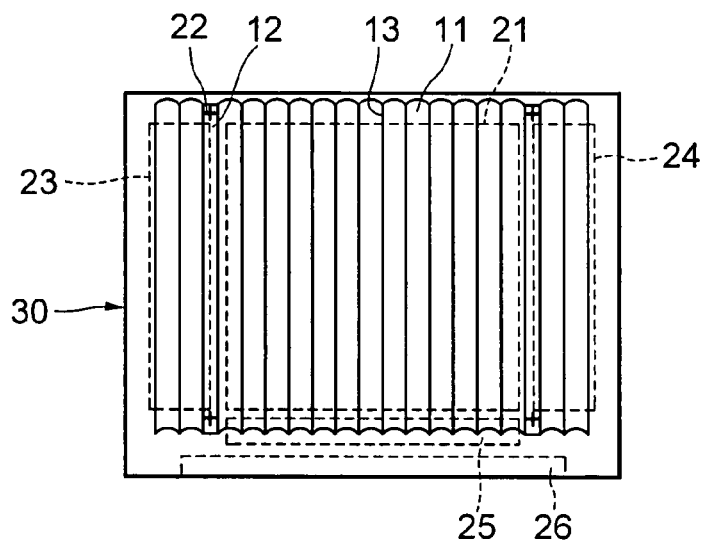
Figure 10A:
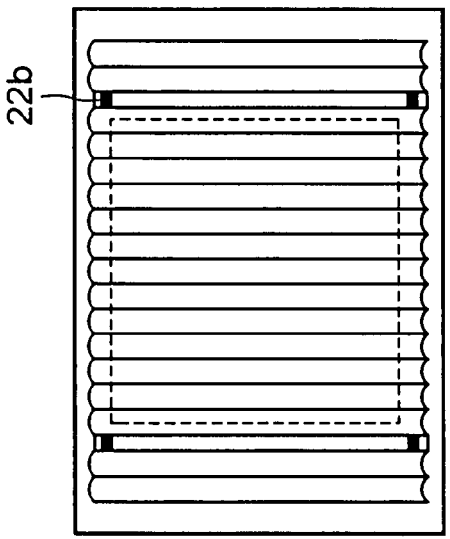
FIGS. 10A, 10B, 10C and 10D are frame format top views showing examples of the positioning mark of the display panel in the display device, where 10A is a cross mark, 10B is a square mark, 10C is a circular mark, and 10D is an I-shaped mark.
Figure 10B:
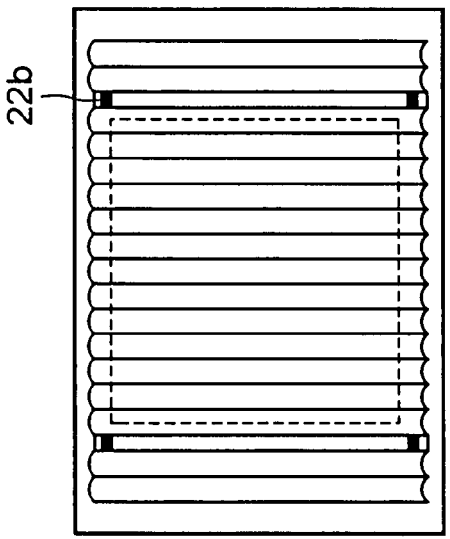
Figure 10C:
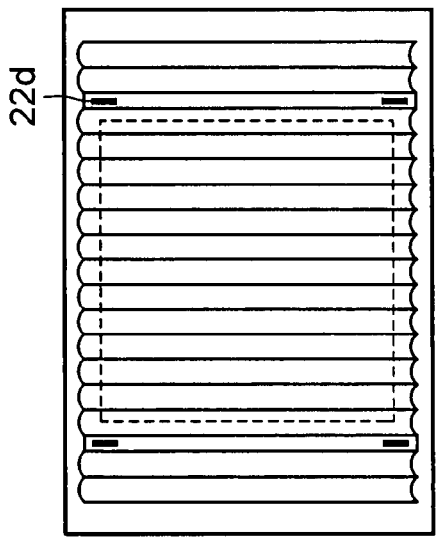
Figure 10D:
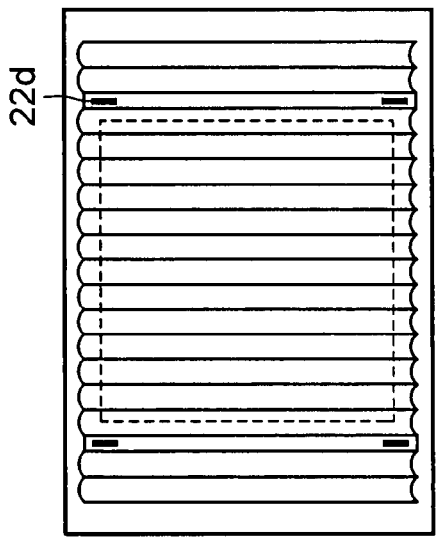

FIGS. 9A, 9B and 9C are top views showing one example of the display device of FIG. 8, where 9A shows the lenticular lens sheet, 9B shows the display panel, and 9C shows the display device combining the lenticular lens sheet and the display panel. The display panel 20 shown in FIG. 9B includes the display part 21, the positioning mark 22, peripheral circuit parts 23, 24, 25, and an end part 26. The peripheral circuit parts 23, 24, 25 may be arranged simply with wirings, or may include a gate drive circuit arranged in the peripheral circuit part 23, a pixel protective circuit in the peripheral circuit part 24, and a source drive circuit in the peripheral circuit part 25.

Figure 20A:
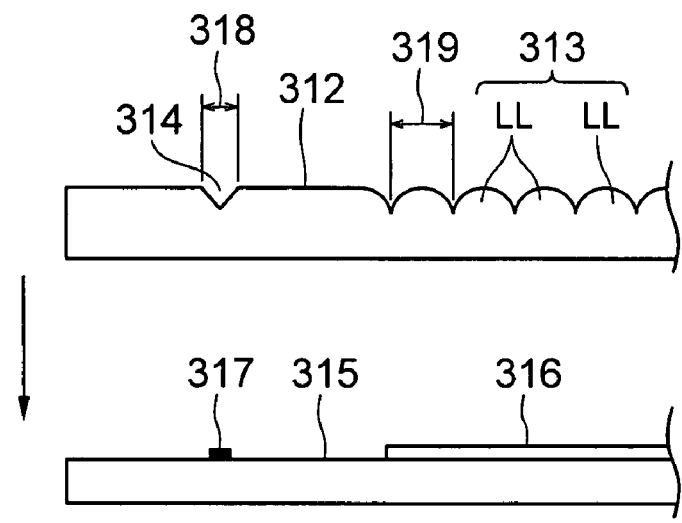
FIGS. 20A and 20B are frame format views in which parts of FIGS. 19A and 19B are enlarged, where 20A is a partial cross sectional view of the lenticular lens plate and the image sheet and 20B is a partial top view of the image sheet.
Figure 20B:
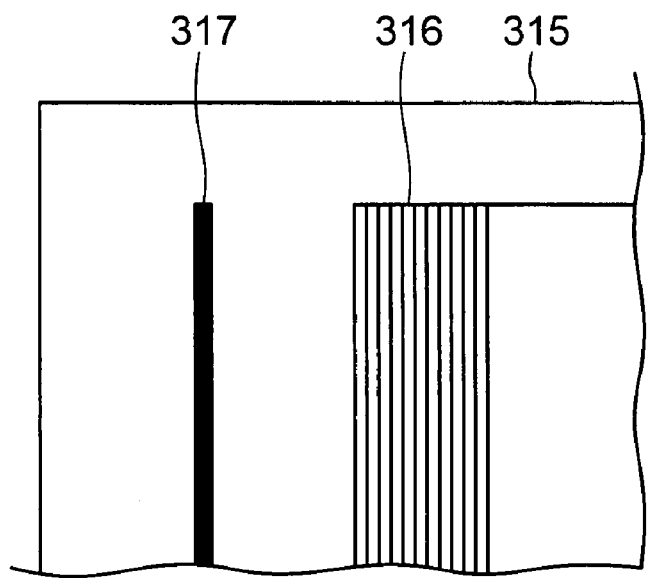
Figure 21A:
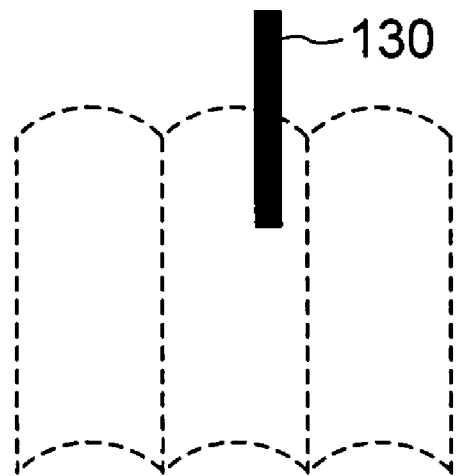
FIGS. 21A and 21B are frame format views describing production of error when observing the reference mark through the lenticular lens, where 21A is a frame format view of the reference mark arranged on the display panel and 21B is a frame format view when observing the reference mark through the lenticular lens.
Figure 21B:
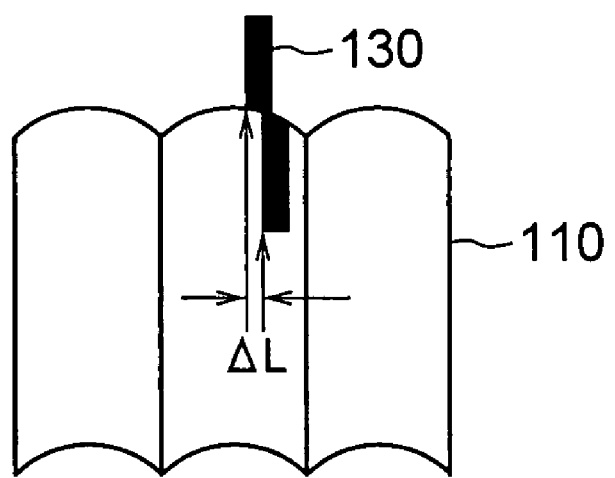
Figure 22A:
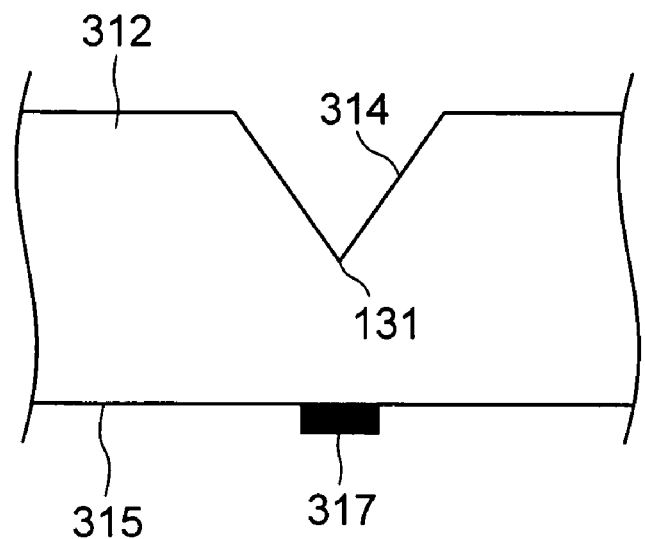
FIGS. 22A and 22B are frame format views of when observing the reference pattern through the groove when the groove pattern is used for the lens, where 22A shows interference of the bottom part of the groove and the reference line and 22B shows lowering in visibility of the reference line caused by the groove shape and the refraction index of the groove material.
Figure 22B:
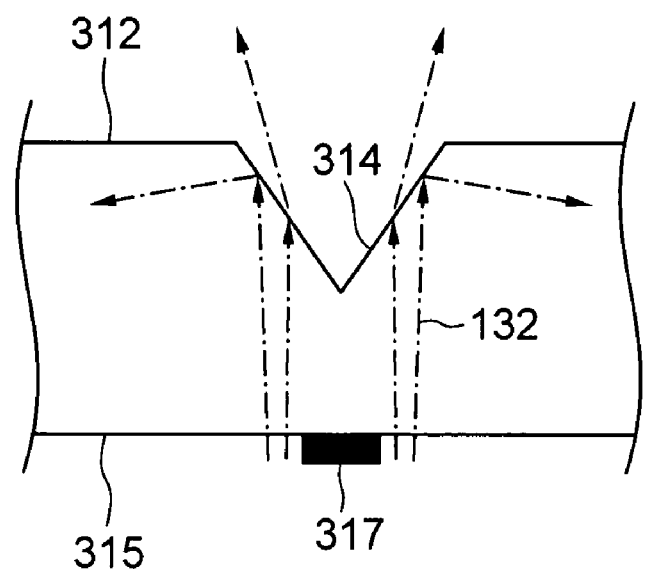

As shown in FIG. 9C, the display device 30 of the present exemplary embodiment is configured such that the non-periodic flat part 12 of the lenticular lens sheet 10 overlaps the positioning mark 22 of the display panel 20. Since the non-periodic flat part 12, which is the lens reference mark, is arranged on the positioning mark 22, the observation shift of the positioning mark due to lens effect in time of alignment, which is described in problems to be solved with reference to FIG. 20, does not occur, and high precision alignment is realized.

The fixing measures of the display panel 20 and the lenticular lens sheet 10 merely needs to transmit the wavelength of at least some of the visible light region. For instance, various adhesives of thermosetting type, ultraviolet curing type, visible light curing type, and the like, and double-faced transparent adhesive film with pressure-sensitive adhesive may be used. Acrylic, epoxy, silicon resin, and the like may be used for the materials of the adhesive, and acrylic, silicon resin, and the like may be used for the materials of the pressure-sensitive adhesive.

Regarding the fixing region, selection of fixation is possible for various regions depending on the product to be applied such as area fixation at the entire surface of the sheet, linear fixation, point fixation, and peripheral fixation at outside the pixel region.

FIGS. 10A, 10B, 10C and 10D are frame format top views showing an example of the positioning mark of the display panel in the display device, where 10A is a cross mark, 10B is a square mark, 10C is a circular mark, and 10D is an I-shaped mark. As shown in FIGS. 10A-10D, the positioning mark may take an arbitrary form as long as the position of the center of gravity of the mark can be calculated through image processing.

Figure 11:
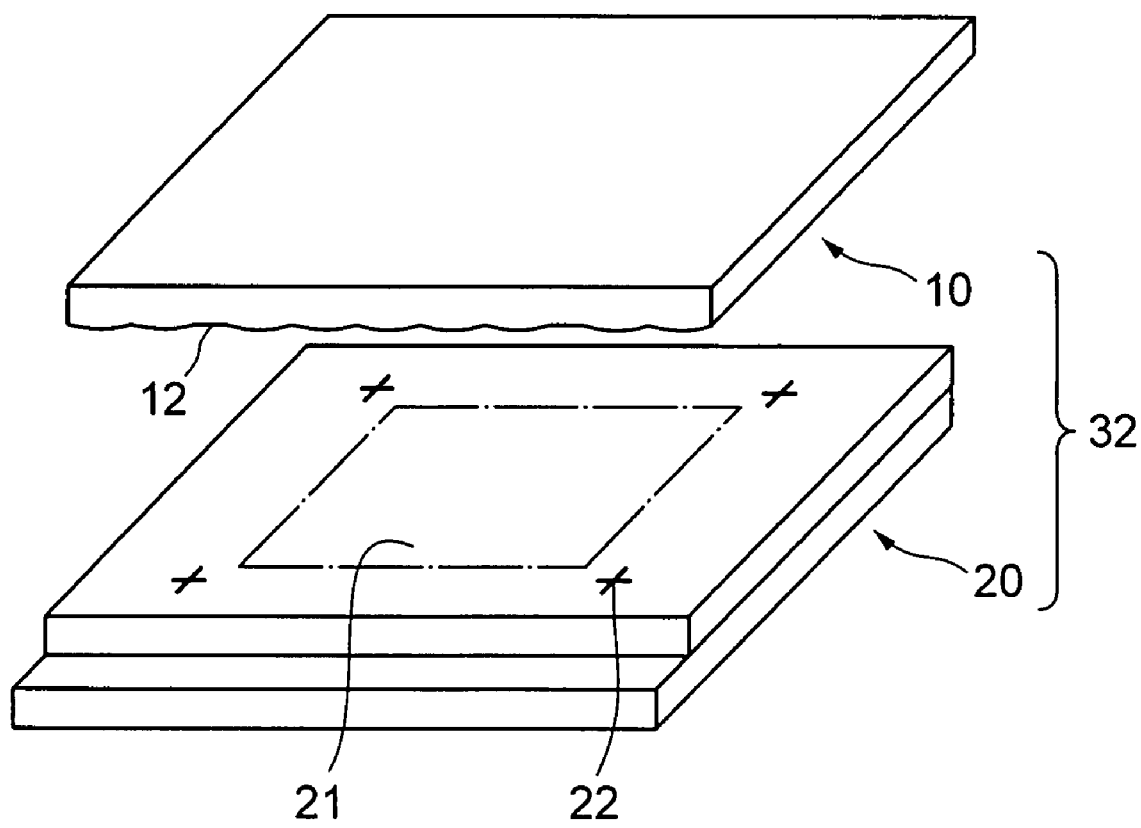
FIG. 11 is a frame format exploded perspective view of an example of fixing the lens surface of the lenticular lens sheet on the display panel side.

The lens surface of the lenticular lens sheet 10 may be fixed on the display panel 20 side. FIG. 11 is a frame format exploded perspective view of an example of fixing the lens surface of the lenticular lens sheet on the display panel side. The display device 32 is configured such that the non-periodic flat part 12 of the lenticular lens sheet overlaps the positioning mark 22 of the display panel 20.

As described above, the display device of the present exemplary embodiment realizes high precision lens mounting by overlapping the reference mark of the display panel and the non-periodic flat part of the lenticular lens sheet, whereby a stereoscopic display device of high image quality can be obtained.

The display device including the lenticular lens sheet 10 and the display panel 20 has been described in the present exemplary embodiment, but the exemplary embodiment of the present invention is not limited thereto, and may be applied to a display device including the optical element array such as fly-eye lens sheet, prism sheet, reflective sheet, and diffusion sheet, and the display panel 20, described in the first exemplary embodiment.

For example, the reflective sheet with a patterned reflective plate may be mounted to match the pixels of the display panel. In this case, the reflective region and the non-reflective region correspond to one pixel of the display panel. A semi-transmissive display device of high image quality is thereby obtained.

The pixel of the display panel and the prism of the prism sheet can be matched and mounted. Furthermore, the diffusion sheet with a patterned diffusion plate may be mounted to match the pixels of the display panel, where the diffusion region and the non-diffusion region correspond to one pixel. A view angle control display device or multiple view point display device of high quality is thereby obtained.

Figure 12:
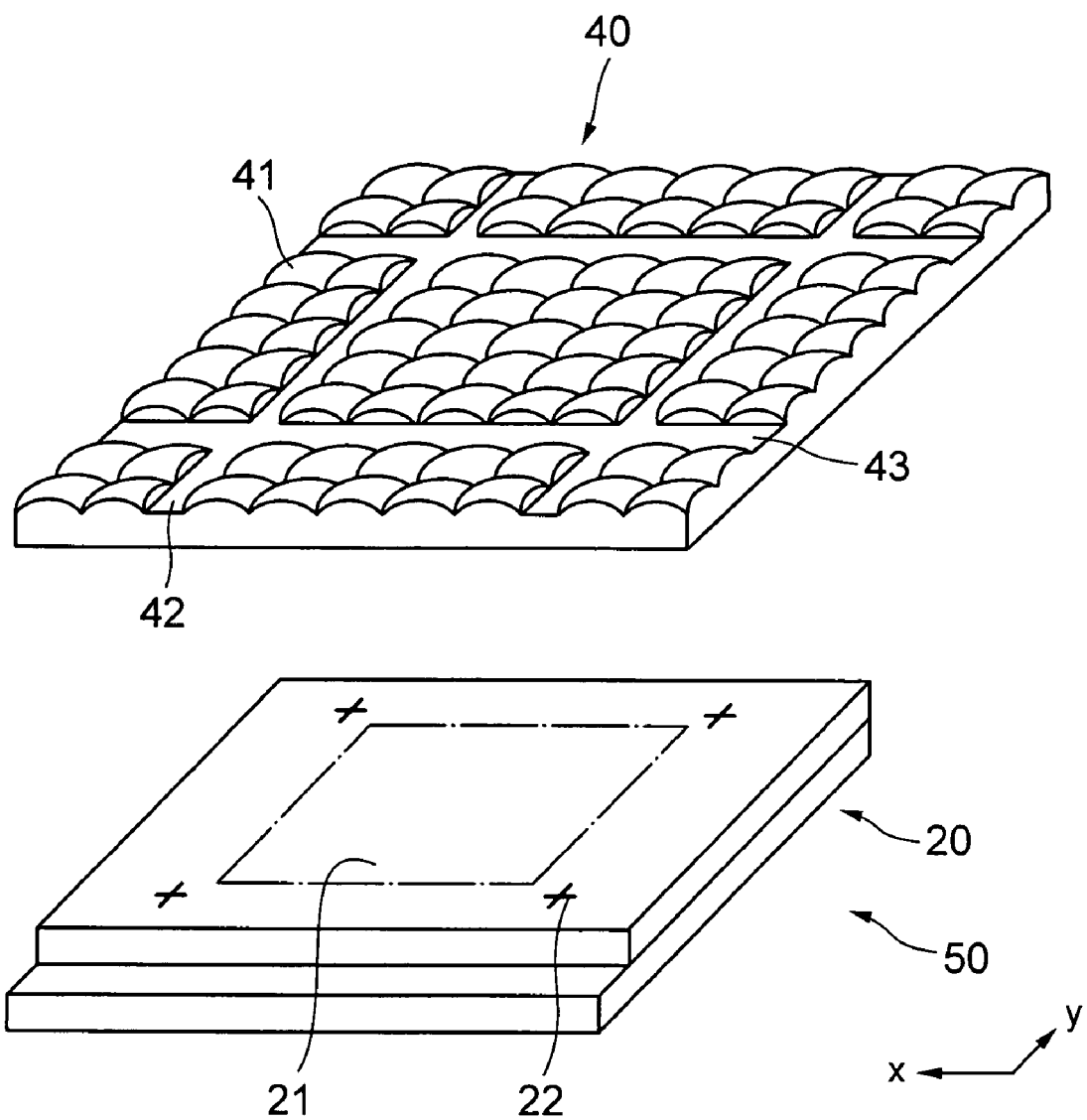
FIG. 12 is a frame format exploded perspective view of a display device including a fly-eye lens sheet and a display panel of the present invention.

FIG. 12 is a frame format exploded perspective view of a display device including a fly-eye lens sheet and a display panel according to the exemplary embodiment of the present invention. A display device 50 includes a fly-eye lens sheet 40 and the display panel 20 according to the exemplary embodiment of the present invention. The display panel 20 includes at least the display part 21 and the positioning mark 22. Different images can be provided in four directions of up, down, left and right by using the fly-eye lens sheet 40. Thus, high precision alignment is required in the up, down, left, and right directions, that is, x-y direction. The first non-periodic flat part 42 contributes the high precision alignment in the x direction, and the second non-periodic flat part 43 orthogonal to the first non-periodic flat part 42 contributes to high precision alignment in the y-direction.

The display measures of the display device in the present exemplary embodiment is not particularly limited, and can be applied to various elements such as liquid crystal element, organic EL element, inorganic EL element, plasma display element, field emission element, and CRT element. The driving method may be an active matrix method using thin film transistor (TFT) and the like, or a passive matrix method.

Figure 13A:
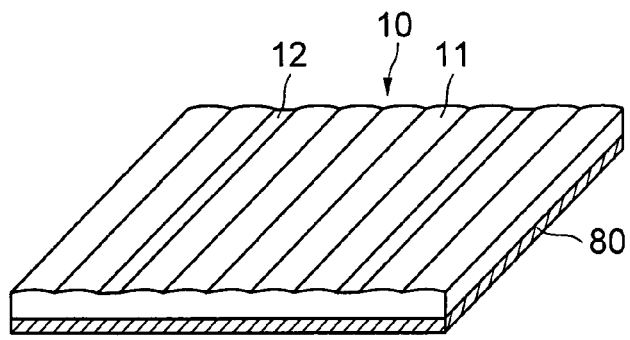
FIGS. 13A, 13B and 13C are frame format perspective views describing a method of manufacturing the display device according to the present exemplary embodiment, where 13A shows a state in which an adhesive layer is formed in the lenticular lens sheet, 13B shows a state in which the lenticular lens sheet attached with the adhesive layer is brought close to the display panel, and 13C shows a state in which the lenticular lens sheet is pressure bonded to the display panel to complete the display device.
Figure 13B:
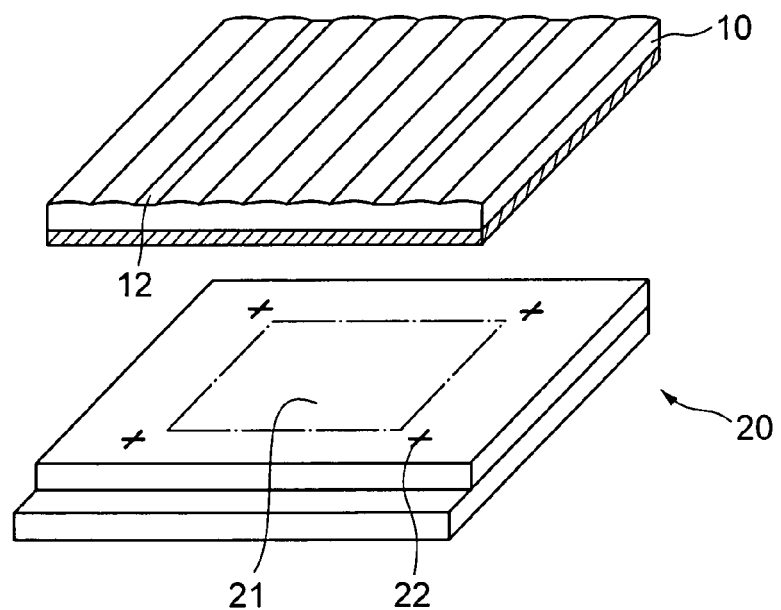
Figure 13C:
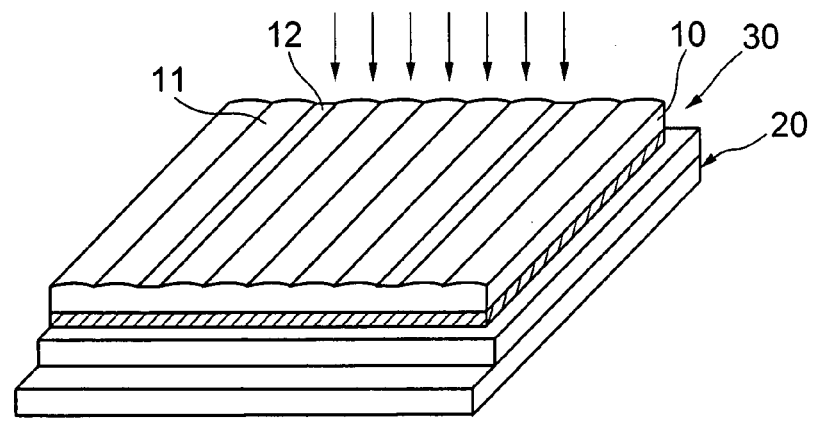

A method of manufacturing the display device according to the present exemplary embodiment will now be described. FIGS. 13A, 13B and 13C are frame format perspective views describing the method of manufacturing the display device according to the present exemplary embodiment, where 13A shows a state in which an adhesive layer is formed in the lenticular lens sheet, 13B shows a state in which the lenticular lens sheet attached with the adhesive layer is brought close to the display panel, and 13C shows a state in which the lenticular lens sheet is pressure bonded to the display panel to complete the display device.

First, an adhesive layer 80 is formed on a flat surface of the lenticular lens sheet 10 as shown in FIG. 13A. The adhesive layer 80 may use thermosetting adhesive, ultraviolet curing adhesive, visible light curing adhesive through application methods such as coater, print, dispenser, or the like, but ultraviolet curing adhesive or visible light adhesive having small thermal load in time of curing is desirable. Other than the adhesives, a double-faced transparent adhesive film having pressure-sensitive adhesive may be applied. The double-faced transparent adhesive film has advantages in that thermal load does not act and in that the adhesive does not protrude out from the lens end face.

As shown in FIG. 13B, the reference position of the lenticular lens sheet 10 is detected by image processing using the non-periodic flat part 12 of the lenticular lens sheet 10, and at the same time, alignment with the non-periodic flat part 12 is performed using the positioning mark 22 in the display panel 20. The method described in FIG. 4 in the first exemplary embodiment can be used to detect the reference position of the lenticular lens sheet 10.

In alignment of the lens sheet and the display panel, positioning is performed such that the center of the non-periodic flat part 12 of the lenticular lens sheet 10 and the center of the positioning mark 22 overlap as shown in FIG. 10. A method of simultaneously imaging the positioning mark 22 and the non-periodic flat part 12, and performing alignment while performing pattern matching of the positioning mark 22 and the non-periodic flat part 12 from the imaged image may be adopted as a method for alignment. The positioning mark 22 and the non-periodic flat part 12 may be imaged with different measures, and the pattern matching may be performed to align the lens sheet and the display panel with the imaged position as the reference.

Lastly, ultraviolet ray or visible light is irradiated in accordance with the type of adhesive while acting pressure between the lenticular lens sheet 10 and the display panel 20 thereby completely fixing the lenticular lens sheet 10 and the display panel 20, as shown in FIG. 13C. Light irradiation is not necessary if the double-faced transparent adhesive film is used for the adhesive layer 80.

Since the non-periodic flat part 12, which is the lens reference mark, is arranged on the positioning mark 22, observation shift of the positioning mark due to lens effect in time of alignment does not occur, and high precision alignment is realized. Furthermore, the mounting precision can be known by checking the mark after the lens sheet and the display panel are completely fixed even if alignment is performed based on the separately imaged information as described above.

Third Exemplary Embodiment

Figure 14:
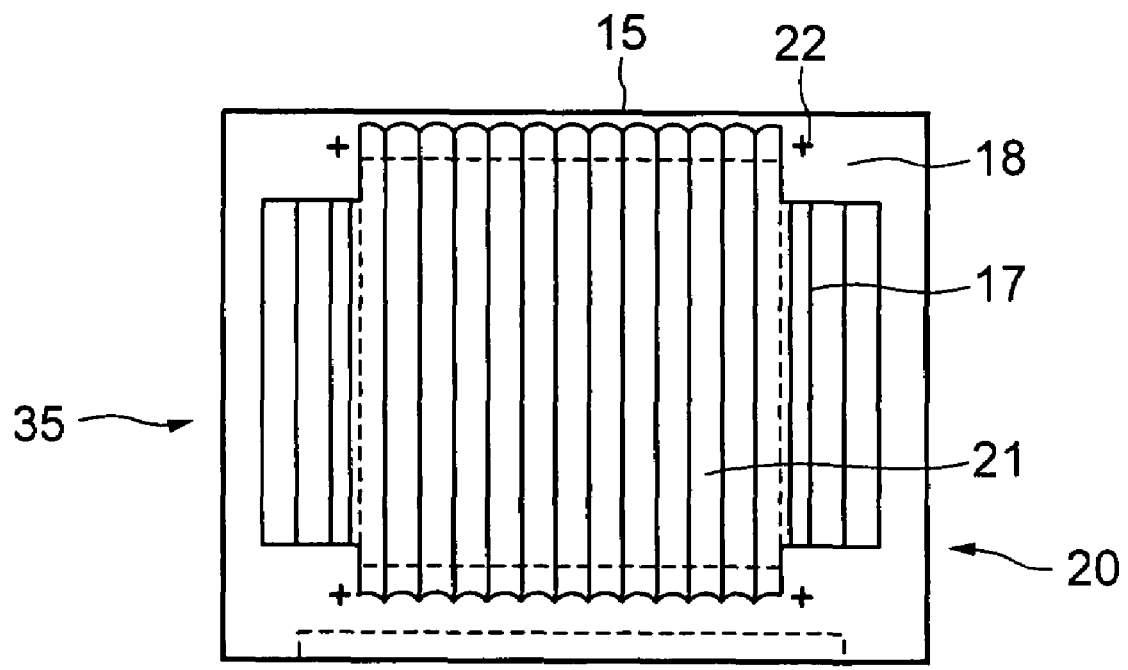
FIG. 14 is a frame format top view of one example of a display device according to a third exemplary embodiment.

In the third exemplary embodiment of the present invention, an example in which a cut-out is formed in the lenticular lens sheet in the display device described in the second exemplary embodiment is shown. FIG. 14 is a frame format top view of one example of a display device according to the third exemplary embodiment. In other words, a lenticular lens sheet 15 in the display device 35 of the third exemplary embodiment is formed with a cut-out portion 18 at the corners of the lenticular lens sheet 15 so that the lenticular lens sheet 15 does not overlap the positioning mark 22 of the display panel 20.

Generally, when forming the optical element array including the lens sheet through injection molding, the thickness of the lens sheet of greater than or equal to 0.3 mm is often required. The thickness of the lens sheet is desirably thicker in terms of optical design or structural mechanics to serve as the display device. Since high precision lens mounting is realized without lowering the image processing recognition precision of the positioning mark 22 even by arranging the cut-out portion 18, a stereoscopic display device of high image quality is obtained.

A case of using the lenticular lens sheet for the optical element array has been described in the present exemplary embodiment, but the present invention is not limited thereto, and the fly-eye lens sheet, prism sheet, reflective sheet, or diffusion sheet described in the second exemplary embodiment is similarly applicable.

Fourth Exemplary Embodiment

Figure 15:
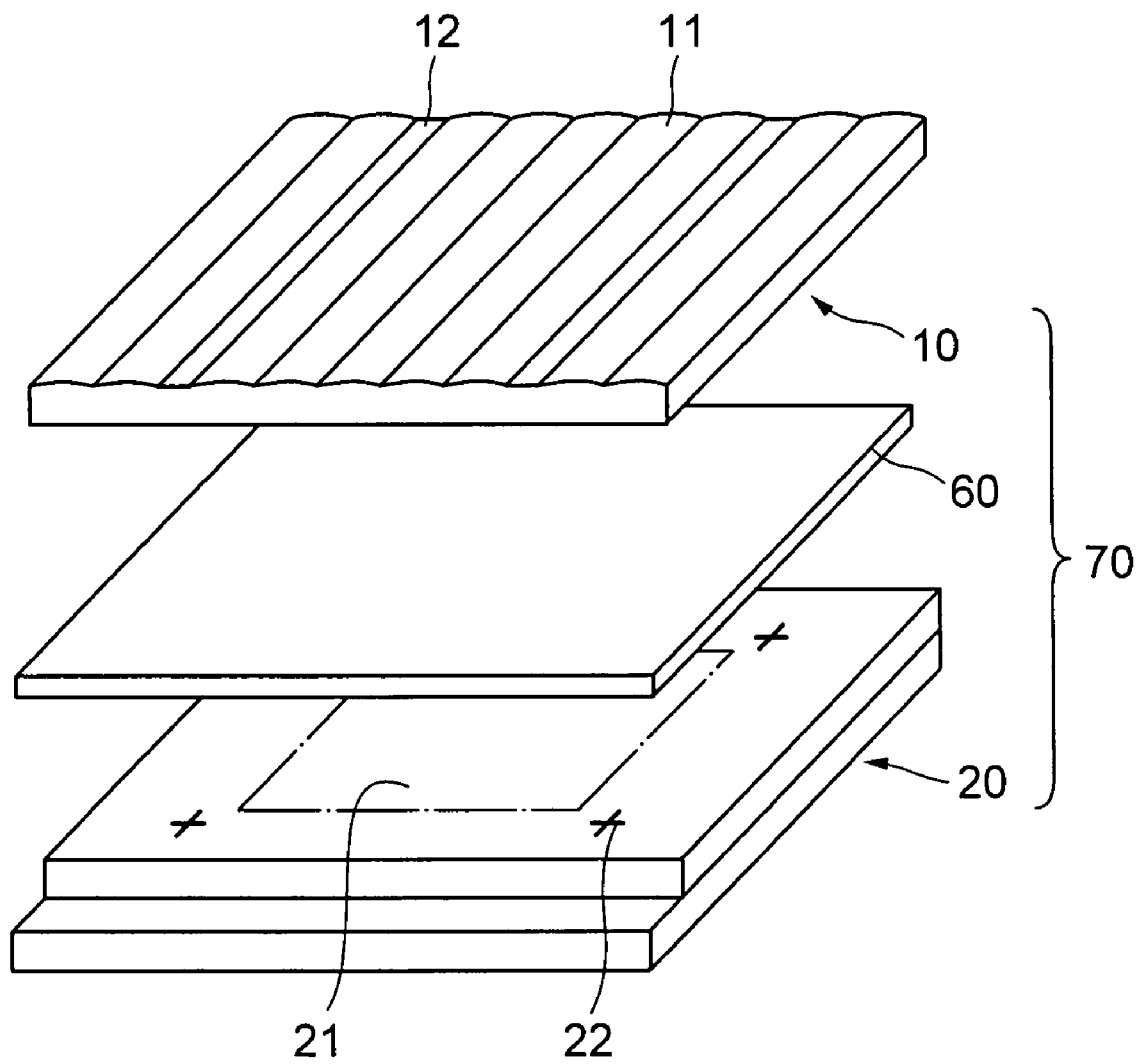
FIG. 15 is a perspective view of one example of a display device according to a fourth exemplary embodiment.
Figure 16:
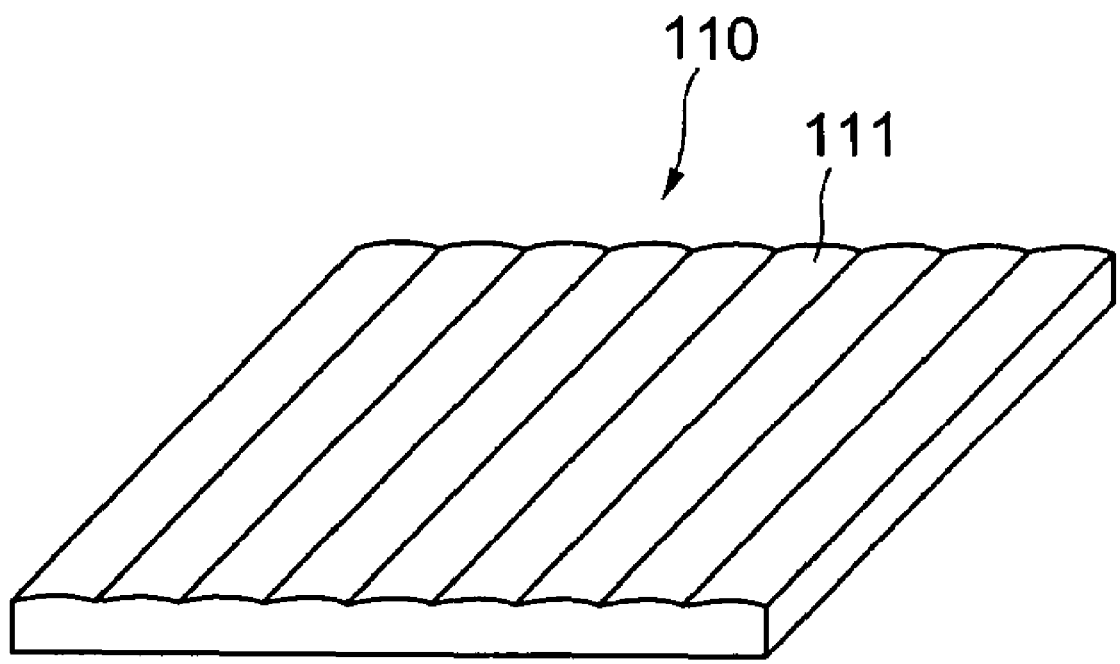
FIG. 16 is a frame format perspective view of a lenticular lens sheet.
Figure 17:
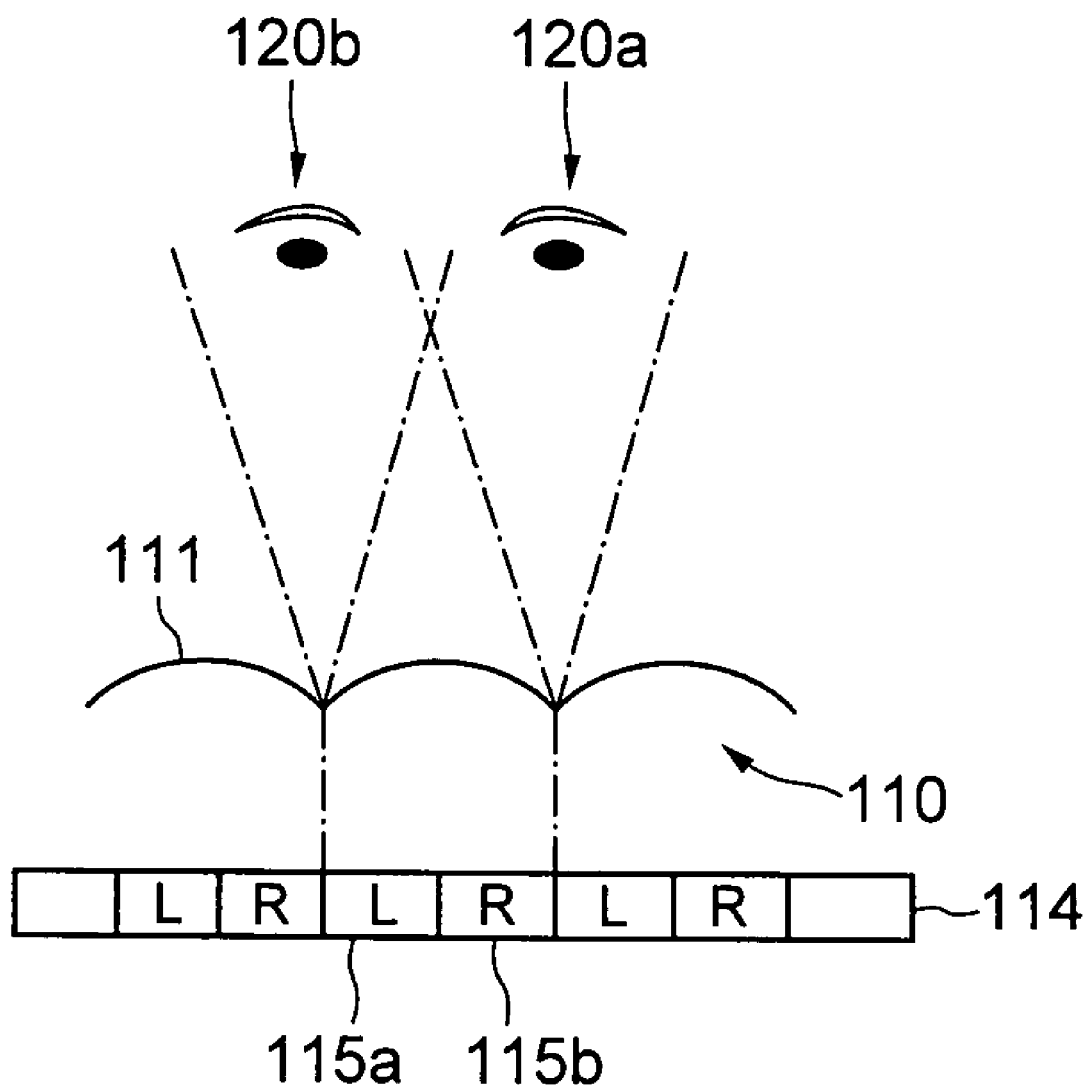
FIG. 17 is a frame format view showing a configuration example of a display device using the lenticular lens sheet and a stereoscopic display method.
Figure 18A:
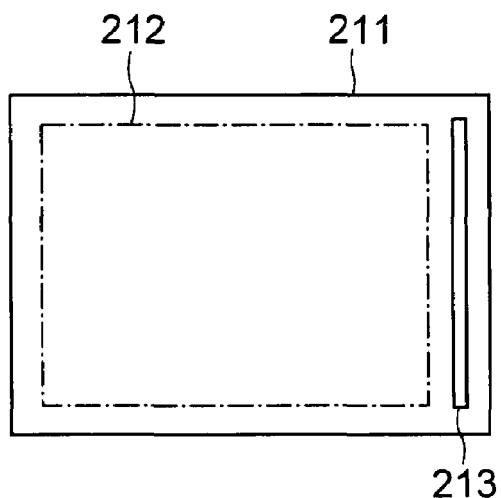
FIGS. 18A, 18B, 18C and 18D are frame format views describing a basic configuration of the invention of patent document 1, where 18A is a frame format view of a display panel, 18B is a frame format view of a lenticular lens plate and an alignment lenticular lens, 18C is a frame format view of a state in which the lenticular lens plate is slanted and overlapped with respect to the display panel, and 18D is a frame format view of when the lenticular lens plate is accurately overlapped.
Figure 18B:
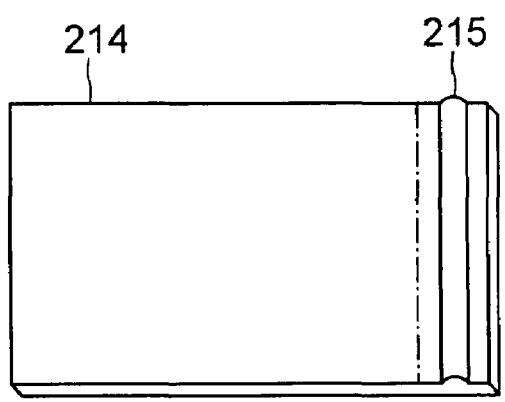
Figure 18C:
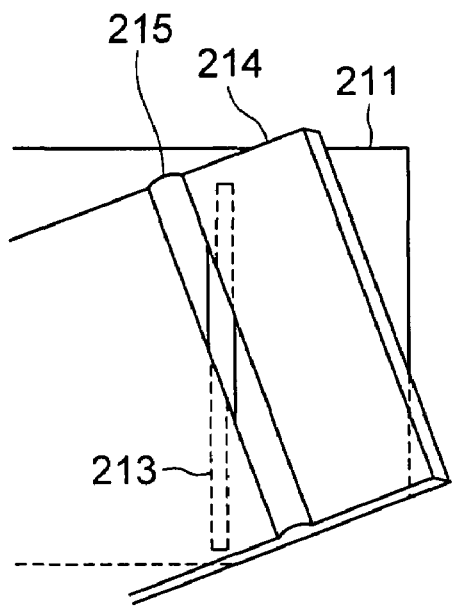
Figure 18D:
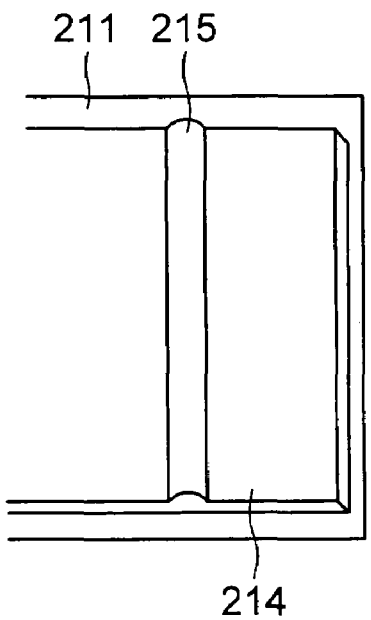
Figure 19A:
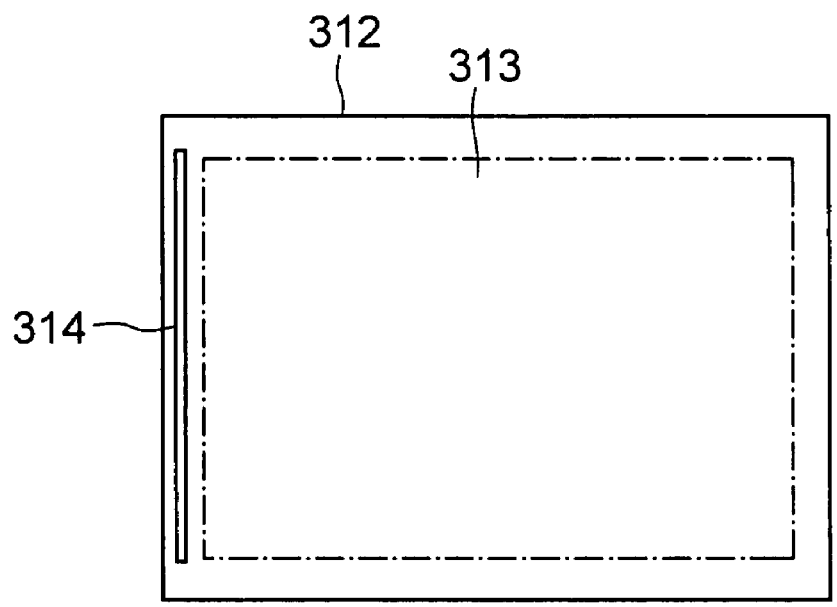
FIGS. 19A and 19B are frame format views describing a basic configuration of the invention of patent document 2, where 19A is a frame format view of a lenticular lens plate and 19B is a frame format view of an image sheet.
Figure 19B:
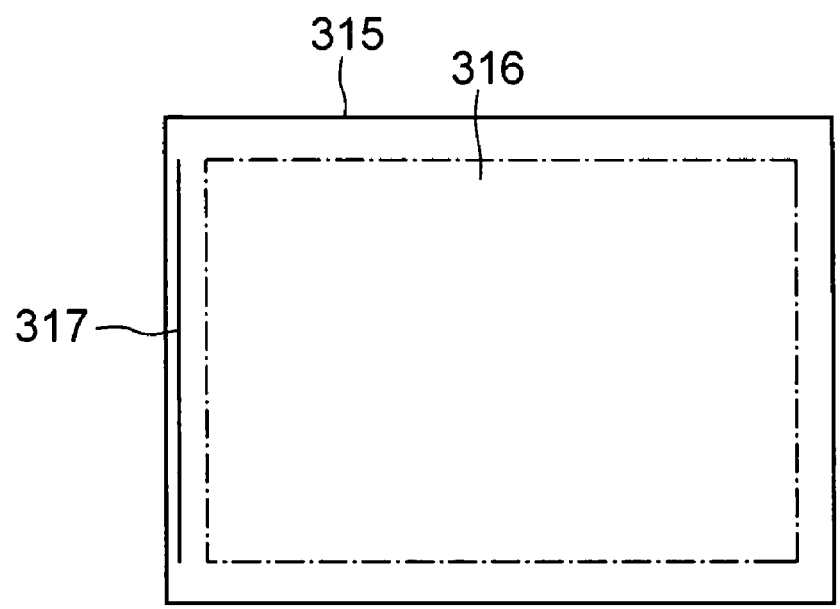

A display device according to a fourth exemplary embodiment of the present invention will now be described. FIG. 15 is a perspective view of one example of a display device according to the fourth exemplary embodiment. That is, a display device 70 according to the fourth exemplary embodiment includes the display panel 20 with at least the display part 21 and the positioning mark 22, a polarization plate 60, and the lenticular lens sheet 10.

The polarization plate 60 may be arranged on the display panel 20 to enhance the visibility under outside light in a case where liquid crystal elements are used for the display panel 20 as a matter of course, and also in a case where self-luminous element such as organic EL element is used.

Similar to the display device 30 described in the second exemplary embodiment, the display device 70 according to the present exemplary embodiment is configured such that the non-periodic flat part 12 of the lenticular lens sheet 10 overlaps the positioning mark 22 of the display panel 20. Since the non-periodic flat part 12, which is the lens reference mark, is arranged on the positioning mark 22, observation shift of the positioning mark due to lens effect in time of alignment does not occur, and high precision alignment is realized. The interposition of the polarization plate 60 on the positioning mark 22 is irrelevant to alignment.

Generally, a hard coat layer consisting mainly of silicon is formed on the surface of the polarization plate 60, and has adhesive affinity with the lenticular lens sheet 10. Therefore, the outer shape of the polarization plate 60 is desirably larger than the outer shape of the lenticular sheet 10. This is to match the fixing surface of the lenticular lens sheet 10 with the surface of the polarization plate.

A charge up preventing transparent electrode is sometimes arranged on the surface of the display panel depending on the type of display panel. In such case, the adhesive force with the lenticular lens sheet further increases by interposing the polarization plate.

As described above, the display device of the present exemplary embodiment realizes high precision lens mounting by overlapping the reference mark of the display panel with the non-periodic flat part of the lenticular lens sheet even if the polarization plate is arranged, and thus a stereoscopic display device of high image quality can be obtained.

A case of using the lenticular lens sheet for the optical element array has been described in the present exemplary embodiment, but the present invention is not limited thereto, and the fly-eye lens sheet, prism sheet, reflective sheet, or diffusion sheet described in the second exemplary embodiment is similarly applicable.

It should be apparent to those skilled in the art that the present invention may be embodied in many other specific forms without departing from the spirit or scope of the invention. Therefore, the present invention is not to be limited to the details given herein, but may be modified within the scope and equivalence of the appended claims.

What is claimed is:

1. An optical element array formed by a plurality of optical elements, comprising:
    at least one non-periodic flat part acting as a reference of alignment when combining with a display panel is arranged;
    a cut-out portion formed at, at least, one corner of corners of the optical element array near the non-periodic flat part; and
    a positioning mark formed at, at least, one corner of corners of the optical element array near the non-periodic flat part, and
        wherein the optical element array does not overlap the positioning mark of the display panel.

2. The optical element array according to claim 1, wherein the non-periodic flat part has an outer shape different from an outer shape of each optical element.

3. The optical element array according to claim 1, wherein the non-periodic flat part is arranged linearly across an entire length of the optical element array.

4. The optical element array according to claim 1, wherein the non-periodic flat part has a thickness of less than or equal to the thickness of each optical element.

5. The optical element array according to claim 1, wherein
    the optical element is a cylindrical lens which is a convex lens with a circular cylindrical surface;
    the optical element array is a lenticular lens sheet in which the cylindrical lens is arranged in plurals in parallel at a same lens pitch; and
    the non-periodic flat part is a non-periodic flat part arranged linearly parallel to a length direction of the cylindrical lens near the ends of the lenticular lens sheet.

6. The optical element array according to claim 5, wherein the width of the non-periodic flat part is different from the width of each lens.

7. The optical element array according to claim 5, wherein the thickness of the non-periodic flat part is less than or equal to the thickness of each lens.

8. An optical element array formed by a plurality of optical elements; wherein
    at least one non-periodic flat part acting as a reference of alignment when combining with a display panel is arranged;
    the optical element is a fly-eye lens which is a convex lens with a spherical surface;
    the optical element array is a fly-eye lens sheet with a lens surface in which the fly-eye lens is arranged in plurals at independent lens pitch in a first direction and in a second direction orthogonal to the first direction; and
    the non-periodic flat part includes a first non-periodic flat part arranged linearly parallel to the first direction, and a second non-periodic flat part arranged linearly parallel to the second direction in the vicinity of the ends of the fly-eye lens sheet.

9. A display device comprising:
    a display panel including a pixel part made up of a plurality of optical elements and a positioning mark for alignment;
    an optical element array including a non-periodic flat part acting as a reference of alignment when combining with the display panel; and
    the positioning mark of the display panel is arranged at a position overlapping the non-periodic flat part of the optical element array, and
    wherein the width of the non-periodic flat part is different from the width of the optical element, and wherein the width of the non-periodic flat part and the width of the optical element are configured to aid in alignment.

10. A display device comprising the optical element array according to claim 9 and a display panel including a pixel part made up of a plurality of optical elements and a positioning mark for alignment; wherein
    the positioning mark of the display panel is arranged at a position overlapping the cut-out portion of the optical element array.

11. The display device according to claim 9, wherein the optical element array and the display panel are fixed with an adhesive measures.

12. The display device according to claim 9, wherein a polarization plate is arranged between the optical element array and the display panel.

13. The display device according to claim 9, wherein the polarization plate has an outer shape larger than an outer shape of the optical element array.

14. A method for manufacturing a display device, comprising:
    providing a display panel including a pixel part made up of a plurality of optical elements and a positioning mark for alignment;
    providing an optical element array including a non-periodic flat part acting as a reference of alignment when combining with the display panel;
    simultaneously imaging and positioning the positioning mark of the display panel and the non-periodic flat part of the optical element array; and
    aligning using the difference in a width of the non-periodic flat part formed in the optical element array and a width of each optical element.

15. A method for manufacturing a display device, comprising:
    forming an optical element array by a plurality of optical elements; wherein at least one non-periodic flat part acting as a reference of alignment when combining with a display panel is arranged, wherein a cut-out portion is formed at corners of the optical element array near the non-periodic flat part;
    providing a display panel including a pixel part made up of a plurality of optical elements and a positioning mark for alignment; wherein the positioning mark of the display panel is arranged at a position overlapping the cut-out portion of the optical element array;

simultaneously imaging the positioning mark of the display panel, the non-periodic flat part of the optical element array, and the cut-out portion formed in the optical element array; and aligning using the difference in a width of the non-periodic flat part formed in the optical element array and a width of each optical element.

16. A method of manufacturing an optical element array in which a plurality of optical elements are arranged at a predetermined period; the method comprising:

forming a plurality of patterns corresponding to the optical element shape at a predetermined period at one part of a die;

forming a flat part adjacent to the pattern at another one part of the die;

forming the width of the flat part to be different from the width of at least one of the plurality of patterns;

forming a pattern corresponding to the optical element shape adjacent to the flat part at another one part of the die; forming a cut-out portion at, at least one corner of the optical element array near the flat part so that the optical element array does not overlap a positioning mark formed on a display panel; and molding the optical element array using the die.

17. A method of manufacturing an optical element array molding die; the method comprising:

cutting a surface of the optical element array molding die at a predetermined period using a cutting tool corresponding to an optical element shape, and at the same time, performing a non-periodic cutting, the period being greater than the predetermined, period, to form a non-periodic flat part in the optical element array molding die.

18. A display device comprising:

a display panel having a pixel part made up of a plurality of optical elements and a positioning mark for alignment; and an optical element array having a non-periodic flat part acting as a reference of alignment when combining with the display panel, and wherein a polarization plate is arranged between the optical element array and the display panel; and has an outer shape larger than an outer shape of the optical element array, and wherein the width of the non-periodic flat part is different from the width of the optical element, and wherein the width of the non-periodic flat part and the width of the optical element are configured to aid in alignment.

* * * * *